(12) United States Patent
Xiong et al.

(10) Patent No.: US 8,164,660 B2
(45) Date of Patent: Apr. 24, 2012

(54) SINGLE ROW BASED DEFECTIVE PIXEL CORRECTION

(75) Inventors: Weihua Xiong, Cupertino, CA (US); Chengming Liu, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 811 days.

(21) Appl. No.: 12/260,023

(22) Filed: Oct. 28, 2008

(65) Prior Publication Data

US 2010/0103292 A1 Apr. 29, 2010

(51) Int. Cl.
H04N 9/64 (2006.01)
H04N 3/14 (2006.01)
(52) U.S. Cl. ........................... 348/246; 348/272
(58) Field of Classification Search .................. 348/246, 348/247, 222.1, 272, 280
See application file for complete search history.

(56) References Cited

U.S. PATENT DOCUMENTS

| | | | | |
|---|---|---|---|---|
| 6,737,625 B2 | 5/2004 | Baharav et al. | ............ | 250/208.1 |
| 6,806,902 B1 * | 10/2004 | Donovan | ...................... | 348/246 |
| 6,876,384 B1 * | 4/2005 | Hubina et al. | ............. | 348/223.1 |
| 6,965,395 B1 * | 11/2005 | Neter | ............................. | 348/129 |
| 7,015,961 B2 | 3/2006 | Kakarala | ........................ | 348/246 |
| 7,034,874 B1 | 4/2006 | Reinhart et al. | ............. | 348/246 |

FOREIGN PATENT DOCUMENTS

| | | |
|---|---|---|
| EP | 1 578 138 | 9/2005 |
| EP | 1 594 308 A1 | 11/2005 |
| GB | 2 364 461 | 1/2002 |
| WO | WO 2006/115627 | 11/2006 |

OTHER PUBLICATIONS

PCT/US2009/061388—PCT International Search Report and Written Opinion, dated Feb. 4, 2010. (14 pages).
PCT/US2009/061388—PCT International Preliminary Report on Patentability, dated May 12, 2011. (10 pages).
PCT/US2009/061388—PCT International Preliminary Report on Patentability, dated May 3, 2011. (10 pages).

* cited by examiner

*Primary Examiner* — Mohammed Hasan
(74) *Attorney, Agent, or Firm* — Blakely Sokoloff Taylor & Zafman LLP

(57) ABSTRACT

An image sensor uses a single row of an array of pixels elements to determine whether a pixel is defective and to recover the defective pixel. The image sensor includes a "maximum of minimum" filter to remove a "black" pixel from a raw image. The image sensor also includes a "minimum of maximum" filter to remove a "white" pixel from the raw image.

32 Claims, 4 Drawing Sheets

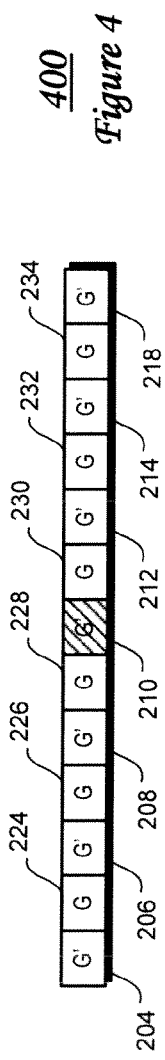
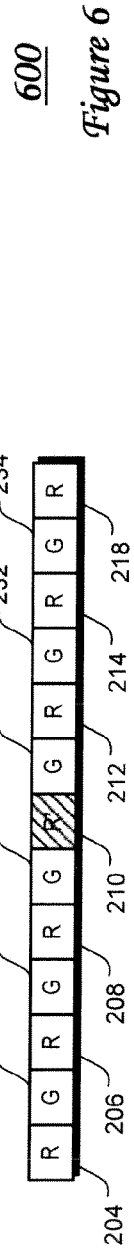
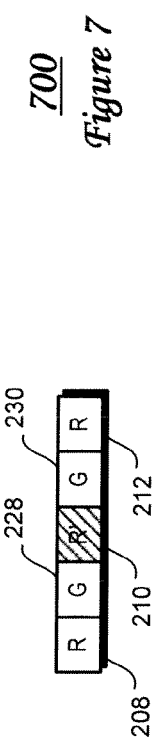
Figure 4 400
Figure 5 500
Figure 6 600
Figure 7 700

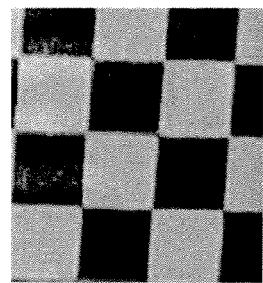
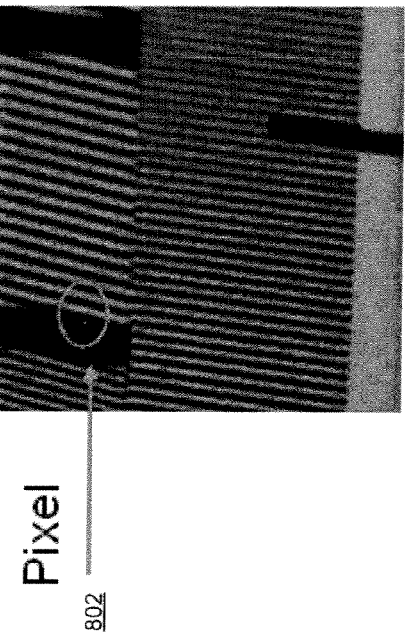
Figure 8
Figure 9

SINGLE ROW BASED DEFECTIVE PIXEL CORRECTION

BACKGROUND

1. Field

Embodiments of the present invention relate to image sensors and, in particular, to correction of defective pixels in image sensors.

2. Discussion of Related Art

A conventional image sensor, which may be fabricated using a complementary metal oxide semiconductor (CMOS) technology or charge coupled device (CCD) technology, includes an array of pixels and associated readout circuitry. A pixel of a typical conventional CMOS image sensor may include a photosensitive element, a micro-lens, one or more light filters, a transfer transistor, a floating diffusion region, reset transistor, source follower, and a row select transistor.

The image sensor generally operates as follows. Light is incident on the micro-lens. The micro-lens focuses the light to the photosensitive element through the light filter. The photosensitive element converts the light into an electrical signal proportional to the intensity of the light detected. The transfer transistor is between the photosensitive element and the floating diffusion region and is used to transfer the electrical signal from the photosensitive element to the floating diffusion region. The electrical signal modulates the source follower. The reset transistor resets the photosensitive element. Keeping in mind that an image sensor array typically includes a large number of pixels, readout circuitry allows signals generated in the photosensitive elements to be processed into a usable image.

Conventional image sensors suffer from some limitations, however. One of the significant factors affecting the performance and yield of color image sensor devices is defective pixels, which may be caused by processing defects, for example. Defective pixels are those pixels in image sensors that fail to sense light correctly. A pixel may produce an electrical signal whose intensity is higher or lower than its neighboring pixels when exposed to a similar light source.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which:

FIG. 4 is a top view illustrating a target pixel and twelve pixels neighboring the target pixel of the single row depicted in FIG. 3 according to an embodiment of the present invention;

FIG. 5 is a top view illustrating a target pixel and two pixels neighboring the target pixel of the single row depicted in FIG. 3 according to an embodiment of the present invention;

FIG. 6 is a top view illustrating a target pixel and twelve pixels neighboring the target pixel of the single row depicted in FIG. 2 according to an embodiment of the present invention;

FIG. 7 is a top view illustrating a target pixel and four pixels neighboring the target pixel of the single row depicted in FIG. 6 according to an embodiment of the present invention;

FIG. 8 illustrates an input image having a defective white pixel and an output image having the defective white pixel detected and recovered according to an embodiment of the present invention; and FIG. 9 illustrates an alternative view of an input image having a defective white pixel and an output image having the defective white pixel detected and recovered according to an embodiment of the present invention.

DETAILED DESCRIPTION OF EMBODIMENTS

Figure 1:
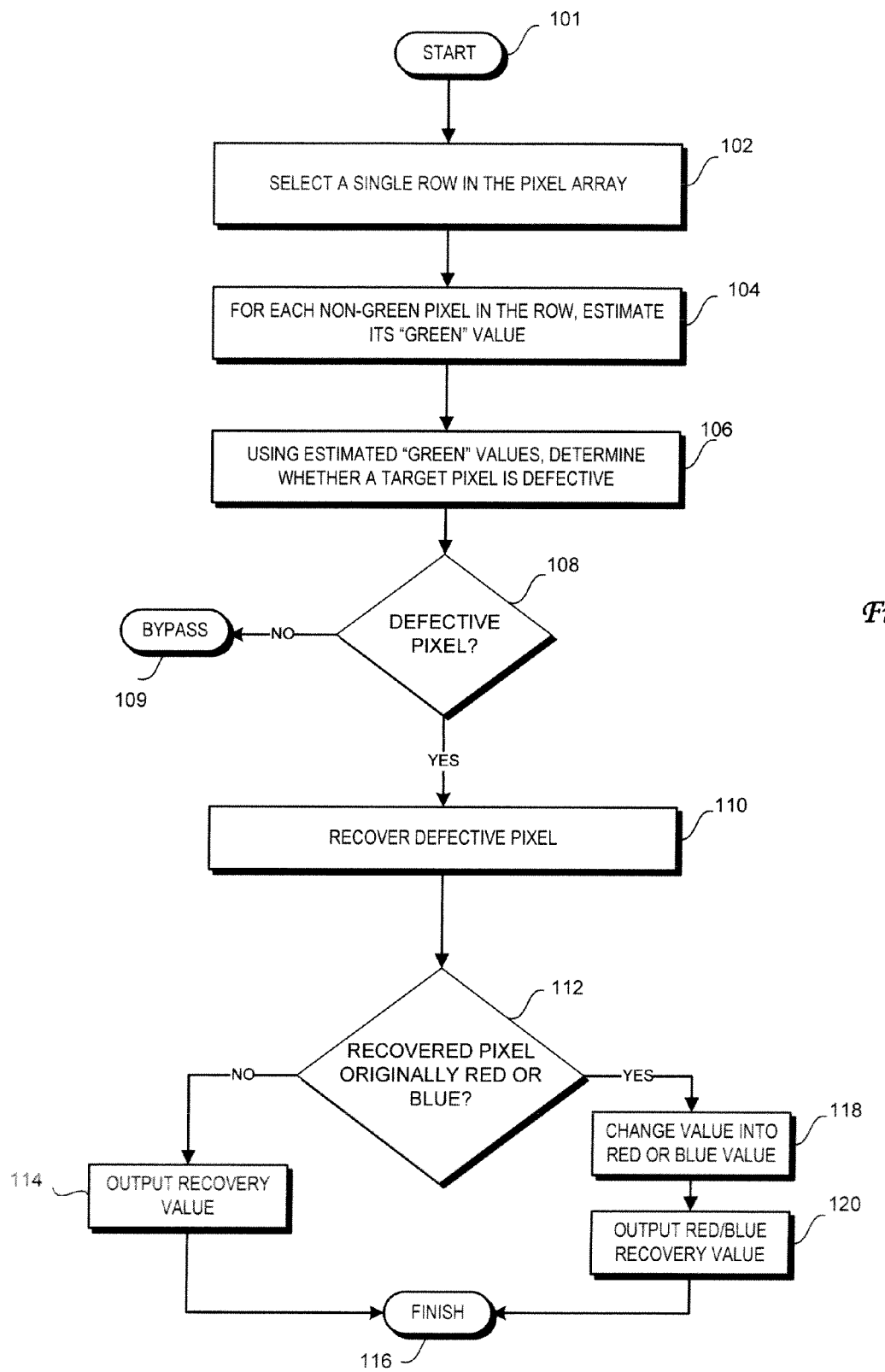
FIG. 1 is a flowchart illustrating a method for detecting and recovering defective pixels according to an embodiment of the present invention.

In the below description, numerous specific details, such as, for example, particular processes, materials, devices, and so forth, are presented to provide a thorough understanding of embodiments of the invention. One skilled in the relevant art will recognize, however, that the embodiments of the present invention may be practiced without one or more of the specific details, or with other methods, components, etc. In other instances, structures or operations are not shown or described in detail to avoid obscuring the understanding of this description.

Reference throughout this specification to "one embodiment" or "an embodiment" means that a particular feature, structure, process, block, or characteristic described in connection with an embodiment is included in at least one embodiment of the present invention. Thus, the appearance of the phrases "in one embodiment" or "in an embodiment" in various places throughout this specification does not necessarily mean that the phrases all refer to the same embodiment. The particular features, structures, or characteristics may be combined in any suitable manner in one or more embodiments.

Embodiments of the present invention include an image processor having an array of pixels disposed in rows and columns. The image processor selects a single row of pixels having pixels of two different colors, such as red and green, for example. For some embodiments, the image processor estimates intensity values for red pixels as if the red (or blue) pixels were green pixels. The image processor determines whether at least one target red pixel in the selected row is defective using the estimated green intensity values. If the target red pixel is defective, the image processor converts the estimated green intensity value of the target red pixel to an estimated red (or blue) intensity value and replaces the actual intensity value of the target red pixel with the estimated intensity value of the target red (or blue) pixel.

One feature of embodiments of the present invention is that the image sensor uses only a single row of the image sensor array to detect and recover a defective pixel. Some embodiments utilize a "minimum of maximum" filter to recover the defective white pixel. Alternatively, some embodiments utilize a "maximum of minimum" filter to recover the defective black pixel. The filters remove the white and/or black pixels in the raw image.

One advantage of embodiments of the present invention is that detection and recovery of a defective pixel using just a single row uses less storage space than conventional detection and recovery techniques. A second advantage is that detection and recovery of a defective pixel using just a single row uses less processing time than conventional detection and recovery techniques. A third advantage is that detection and recovery of a defective pixel using just a single row involves lower circuitry costs than conventional detection and recovery techniques. Other features and advantages will be apparent to persons of ordinary skill in the art after reading the description herein.

FIG. 1 is a flowchart illustrating a method 100 for detection and correction of defective pixels according to an embodiment of the present invention. In a block 101, the method 100 begins and control passes to a block 102 in which the method 100 selects a single row in a pixel array to process. The method 100 is described further with reference to FIGS. 2A, 2B, and 3-9.

Figure 2A:
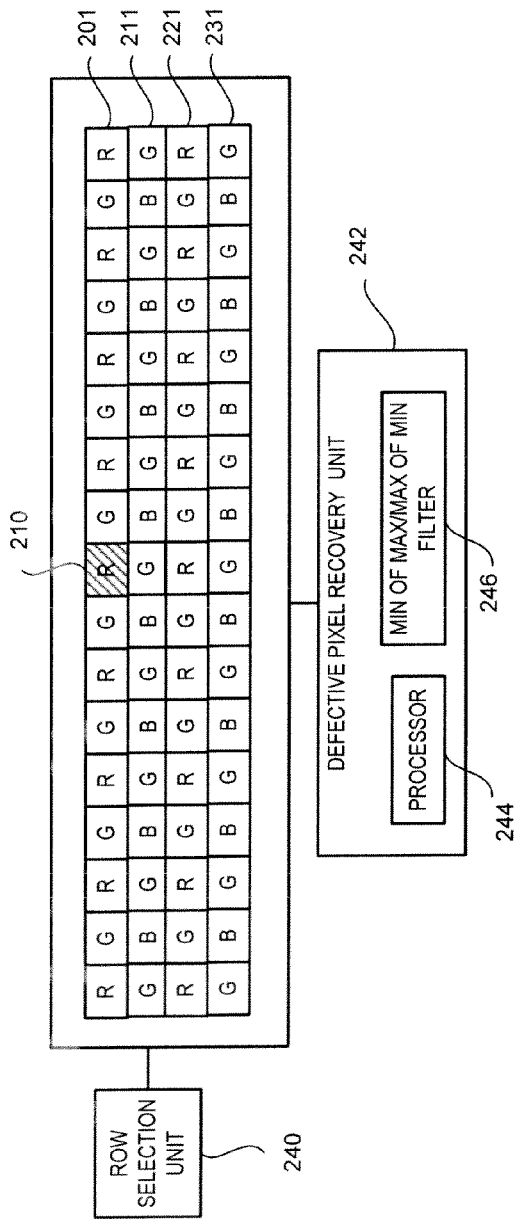
FIG. 2A is top view illustrating an array of pixels according to an embodiment of the present invention in which one of the pixels is defective.

FIG. 2A is a top view illustrating an array of pixels 200 arranged in rows 201, 211, 221, and 231 according to an embodiment of the present invention. In the illustrated embodiment, a four by seventeen array of rows and columns is shown. Of course, the array of pixels 200 can include upwards of thousands of rows and/or columns, or more. The illustrated rows 201 and 221 have several red and green pixels and the illustrated rows 211 and 231 have several blue and green pixels. The pixels in the array of pixels 200 may be arranged in a Bayer pattern.

For some embodiments, row 201 is selected using row selection unit 240. For other embodiments, one of the other rows 211, 221, and 231 is selected using row selection unit 240. In embodiments in which row 201 is selected, defective pixel recovery unit 242, which includes a processor 244 and "min of max/max of min" filter 246, may determine whether a target red pixel 210 is defective and if so recover an intensity value for the target red pixel 210.

Figure 2B:
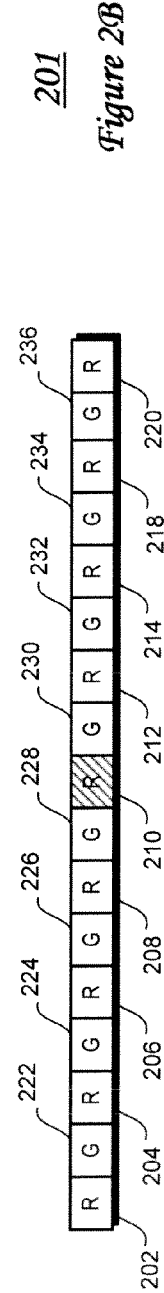
FIG. 2B is a top view illustrating a single row in the array of pixels of FIG. 2A according to an embodiment of the present invention.

FIG. 2B is a top view illustrating the selected row 201 according to an embodiment of the present invention. The row 201 includes several red pixels 202, 204, 206, 208, 212, 214, 218, 220, and the target red pixel 210. The row 201 also includes several green pixels 222, 224, 226, 228, 23, 232, 234, and 236.

Returning to FIG. 1, in a block 104 for each non-green pixel in the selected row the method 100 estimates its green intensity value. Staying with the example illustrated in FIG. 2B the defective pixel recovery unit 242 may estimate the intensity value for each red pixel 202, 204, 206, 208, 210, 212, 214, 218, and 220 as if the red pixels 202, 204, 206, 208, 210, 212, 214, 218, and 220 were green pixels. Although the green intensity value is estimated for each red pixel 202, 204, 206, 208, 210, 212, 214, 218, and 220, for ease of discussion only the method of estimating the green intensity value of red pixel 210 is described. After reading the description herein a person of ordinary skill in the art will be able to estimate the green intensity values for the remaining red pixels 202, 204, 206, 208, 212, 214, 218, and 220.

For some embodiments, in order to estimate the green intensity value for the red pixel 210, the estimated green intensity value for the red pixel 210 may be extrapolated using neighboring pixels. The difference in color between red pixel 204 and adjacent green pixel 224 may be calculated as a first color difference value, the difference in color between red pixel 206 and adjacent green pixel 226 may be calculated as a second color difference value, and the difference in color between red pixel 208 and adjacent green pixel 228 may be calculated as a third color difference value. This gives three color difference values for the left side of the target red pixel 210.

The process is repeated to arrive at three color difference values for the right side of the target red pixel 210. For example, the difference in color between red pixel 218 and adjacent green pixel 234 may be calculated as a fourth color difference value, the difference in color between red pixel 214 and adjacent green pixel 232 may be calculated as a fifth color difference value, and the difference in color between red pixel 212 and adjacent green pixel 230 may be calculated as a sixth color difference value.

Figure 3:
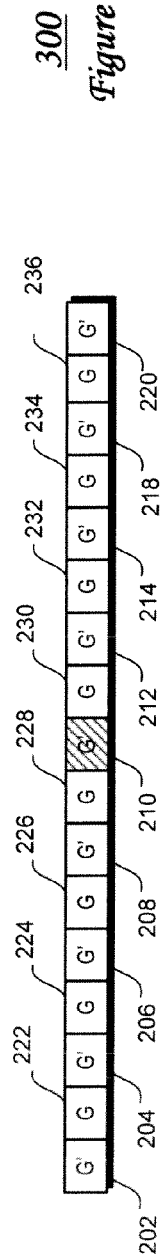
FIG. 3 is a top view illustrating the single row of pixels in FIG. 2B with estimated green intensity values according to an embodiment of the present invention.

After the six color difference values are calculated the defective pixel recovery unit 242 selects the median value from among the six color difference values. The median value of the six color difference values is used to compute the estimated green intensity value for the red pixels 202, 204, 206, 208, 210, 212, 214, 218, and 220. FIG. 3 is a top view illustrating the row 201 having the original intensity values (R) for the red pixels 202, 204, 206, 208, 210, 212, 214, 218, and 220 replaced with estimated green intensity values (G') according to an embodiment of the present invention.

Returning to FIG. 1, in a block 106 using the estimated green intensity values, the method 100 determines whether a target pixel in the selected row is defective. Staying with the example, defective pixel recovery unit 242 may use the estimated green intensity values (G') of the red pixels 202, 204, 206, 208, 210, 212, 214, 218, and 220, to determine whether the target red pixel 210 is defective. For some embodiments, defective pixel recovery unit 242 performs a linear interpolation among the estimated green intensity values (G') of the six pixels immediately to the right of the target red pixel 210 and for the six pixels to the immediate left of the target red pixel.

FIG. 4 is a top view illustrating the target red pixel 210, the six pixels 204, 224, 206, 226, 208, and 228 to the left of the target red pixel 210, and the six pixels 230, 212, 232, 214, 234, and 218 to the right of the target red pixel 210 according to an embodiment of the present invention. If the estimated green intensity value (G') of the target red pixel 210 is greater than the interpolated value and is greater than the maximum value of the six pixels 204, 224, 206, 226, 208, and 228 to the left of the target red pixel 210, and the six pixels 230, 212, 232, 214, 234, and 218 to the right of the target red pixel 210 by a predetermined threshold value, then defective pixel recovery unit 242 determines that the target red pixel 210 is a defective "white" pixel. This means, for example, that the target red pixel 210 is white regardless of the light source to which the target red pixel 210 is exposed. The predetermined threshold may be used to account for false readings, for example.

If, on the other hand, the estimated green intensity value (G') of the target red pixel 210 is less than the interpolated value and is less than the minimum value of the six pixels 204, 224, 206, 226, 208, and 228 to the left of the target red pixel 210, and the six pixels 230, 212, 232, 214, 234, and 218 to the right of the target red pixel 210 by a predetermined threshold value, then defective pixel recovery unit 242 determines that the target red pixel 210 is a defective "black" pixel. This means, for example, that the target red pixel 210 is black regardless of the light source to which the target red pixel 210 is exposed.

Returning back to FIG. 1, if it is determined in a block 108 that the target red pixel 210 is not a defective pixel control passes to a block 109 in which the recovery process is bypassed. If on the other hand it is determined in a block 108 that the target red pixel 210 is a defective pixel control passes to a block 110 in which the defective pixel recovery unit 242 recovers the target red pixel 210. The defective pixel recovery unit 242 may determine a recovery intensity value for the target red pixel 210 by attempting to find a suitable matching point and/or matching pixel. If no suitable matching point can be found, the defective recovery unit 242 selects the maximum value between two other candidates and uses the selected candidate as the recovery intensity value of the target red pixel 210.

To find a suitable matching point, the defective pixel recovery unit 242 may select a pixel from among the six pixels 204, 224, 206, 226, 208, and 228 to the left of the target red pixel 210, and the six pixels 230, 212, 232, 214, 234, and 218 to the right of the target red pixel 210 illustrated in FIG. 4. The selected pixel should have an estimated intensity value (G') close to the estimated intensity value (G') of the target red pixel 210. For instance, the selected pixel and the target red pixel 21 should have similar intensity values and second derivative values. The defective pixel recovery unit 242 may take the second derivatives of the estimated intensity values (G') for the six pixels 204, 224, 206, 226, 208, and 228 to the left of the target red pixel 210, and the six pixels 230, 212, 232, 214, 234, and 218 to the right of the target red pixel 210. The second derivative values should be greater than or equal to one-half the estimated intensity value (G') of the target red pixel 210.

If the defective pixel recovery unit 242 cannot find a pixel that has an estimated intensity value (G') close to the estimated intensity value (G') of the target red pixel 210 and/or if the second derivatives of the estimated intensity values (G') for the six pixels 204, 224, 206, 226, 208, and 228 to the left of the target red pixel 210, and the six pixels 230, 212, 232, 214, 234, and 218 to the right of the target red pixel 210 are not greater than or equal to one-half the estimated intensity value (G') of the target red pixel 210, the defective pixel recovery unit 242 determines that there may be no suitable matching point/matching pixel.

Absent a suitable matching point, the defective pixel recovery unit 242 may look for a first candidate for the recovery intensity value of the target red pixel 210. To find the first candidate, the defective pixel recovery unit 242 may select the maximum estimated intensity value (G') of the six pixels 204, 224, 206, 226, 208, and 228 to the left of the target red pixel 210 and select the maximum estimated intensity value (G') of the six pixels 230, 212, 232, 214, 234, and 218 to the right of the target red pixel 210. The defective pixel recovery unit 242 may then select the minimum estimated intensity value (G') from between these two maximum estimated intensity values (G') to be the first candidate for the recovery value of the target pixel 210. The process is reversed for "black" pixels in that the defective pixel recovery unit 242 may then select the maximum estimated intensity value (G') from between two minimum estimated intensity values (G') to be the first candidate for the recovery value of the target pixel 210.

The defective pixel recovery unit 242 may look for a second candidate for the recovery intensity value of the target red pixel 210. To find the second candidate, the defective pixel recovery unit 242 may obtain three values: (1) the estimated intensity value (G') of the first pixel 228 to the left of the target red pixel 210, (2) the estimated intensity value (G') of the first pixel 230 to the right of the target red pixel 210 (both of which are illustrated in FIG. 5), and (3) the linear interpolation of the estimated green intensity values (G') of the six pixels 204, 224, 206, 226, 208, and 228 to the left of the target red pixel 210, and the six pixels 230, 212, 232, 214, 234, and 218 to the right of the target red pixel 210 (illustrated in FIG. 4). The defective pixel recovery unit 242 may select the maximum of these three values to be the second candidate for the recovery intensity value of the target red pixel 210. For a "black" pixel, the defective pixel recovery unit 242 may select the minimum of these three values to be the second candidate for the recovery intensity value of the target red pixel 210.

If there is no suitable matching point/pixel, the defective pixel recovery unit 242 may use the maximum estimated intensity value (G') between the first candidate and the second candidate as the recovery intensity value of the target red pixel 210.

Although the method 100 of FIG. 1 has been described with the target pixel 210 being red, this is not necessarily the case. Thus when the recovery intensity value of the target pixel 210 is determined, in a block 112 of FIG. 1 it is determined whether the target pixel 210 is green or a non-green pixel. If the target pixel 210 is a green pixel, in a block 114 the defective pixel recovery unit 242 outputs the matching point value, if suitable, as the recovery intensity value of the target pixel 210. If there is no suitable matching point, the defective pixel recovery unit 242 outputs the maximum estimated intensity value (G') between the first candidate and the second candidate as the recovery intensity value for the target pixel 210 if the target pixel 210 is a "white" pixel.

If, on the other hand, the target pixel 210 is a non-green pixel, such as a red or blue pixel, for example, in a block 116 the defective pixel recovery unit 242 converts the recovered intensity value for the target pixel 210 into estimated red or blue values. Staying with the example, because the target pixel 210 is a red pixel, the defective pixel recovery unit 242 may convert the recovered intensity value to an estimated red intensity value. The defective pixel recovery unit 242 may analyze the local color difference between a pair of adjacent pixels. Referring now to FIG. 6, the defective pixel recovery unit 242 may calculate the color difference between the pixel 208 and the pixel 228 and use the calculated color difference to determine what an estimated red value (R') for the recovered intensity value for the target pixel 210 would be.

Additionally, the resulting estimated red value (R') for the recovered intensity value for the target pixel 210 should not be smaller than the average of two adjacent pixels of the same color. Thus, referring now to FIG. 7, the defective pixel recovery unit 242 may determine whether the estimated red value (R') for the recovered intensity value for the target pixel 210 is smaller than the average of the pixels 208 and 212. If the estimated red value (R') for the recovered intensity value for the target pixel 210 is larger than the average of the pixels 208 and 212, the defective pixel recovery unit 242 may replace the intensity value of the original target pixel 210 with the estimated red value (R') for the recovered intensity value for the target pixel 210. If the intensity of the recovery value is smaller than the average of the two closest red pixels, the defective pixel recovery unit 242 may use the average of the two closest red pixels to recover the intensity value of the target pixel 210.

FIG. 8 illustrates an input image (a) having a white pixel 802 located next to a white region and an output image (b) that has the white pixel 802 successfully recovered according to embodiments of the present invention. FIG. 9 illustrates an image of a resolution chart that shows that embodiments of the present invention may retain details in the high frequency regions very well while removing the white pixel 802 from the input image (a). One advantage of retaining details in the high frequency regions is that image details may be retained while removing unnecessary white pixels.

Embodiments of the present invention may be implemented using hardware, software, or a combination thereof. In implementations using software, the software or machine-readable data may be stored on a machine-accessible medium. The machine-readable data may be used to cause a machine, such as, for example, a processor (not shown) to perform the method and processes herein.

A machine-readable medium includes any mechanism that may be adapted to store and/or transmit information in a form accessible by a machine (e.g., a computer, network device, personal digital assistant, manufacturing tool, any device with a set of one or more processors, etc.). For example, a machine-readable medium includes recordable and non-recordable media (e.g., read only (ROM), random access (RAM), magnetic disk storage media, optical storage media, flash devices, etc.), such as electrical, optical, acoustic, or other form of propagated signals (e.g., carrier waves, infrared signals, digital signals, etc.).

The operations of the methods herein have been described as multiple discrete blocks performed in turn in a manner that may be most helpful in understanding embodiments of the invention. However, the order in which they are described should not be construed to imply that these operations are necessarily order dependent or that the operations be performed in the order in which the blocks are presented. Of course, the methods are example methods and other methods may be used to implement embodiments of the present invention.

The terms used in the following claims should not be construed to limit embodiments of the invention to the specific embodiments disclosed in the specification and the claims. Rather, the scope of embodiments of the invention is to be determined entirely by the following claims, which are to be construed in accordance with established doctrines of claim interpretation.

What is claimed is:

1. A method for correcting a defective pixel in an image processor, the image sensor having an array of pixels disposed in a plurality of rows, the method comprising:
    selecting a row of pixels from among the plurality of rows, wherein the row includes a plurality of pixels having a first color and a plurality of pixels having a second color;
    estimating intensity values for pixels having the second color as if the pixels having the second color were pixels having the first color;
    using the estimated intensity values for pixels having the second color, determining whether at least one target pixel in the row is defective; and
    if the target pixel is defective, converting the estimated intensity values for the target pixel from the second color to an estimated intensity value for the first color and replacing an actual intensity value for the target pixel with a recovery intensity value for the target pixel, the recovery intensity value being the estimated intensity value for the first color.

2. The method of claim 1, wherein the estimating intensity values includes extrapolating intensity values for the target pixel using intensity values of a group of neighboring pixels.

3. The method of claim 2, wherein the estimating intensity values further includes calculating, for each pair of adjacent pixels in the group of neighboring pixels, color differences between individual pixels in the pairs of adjacent pixels.

4. The method of claim 3, wherein the estimating intensity values further includes selecting a median intensity value from among the calculated color differences.

5. The method of claim 1, wherein the estimating intensity values further includes performing linear interpolation of estimated intensity values for the group of neighboring pixels to arrive at an average estimated intensity value for the group of neighboring pixels.

6. The method of claim 5, further comprising characterizing the target pixel as a defective "white" pixel if:
    an estimated intensity value for the target pixel is greater than the average estimated intensity value for the group of neighboring pixels plus a predetermined threshold value; and
    the estimated intensity value for the target pixel is greater than or equal to a maximal estimated intensity value for any one pixel in the group of neighboring pixels.

7. The method of claim 5, further comprising characterizing the target pixel as a defective "black" pixel if:
    an estimated intensity value for the target pixel is less than the average estimated intensity value for the group of neighboring pixels minus a predetermined threshold value; and
    the estimated intensity value for the target pixel is smaller than or equal to a minimal estimated intensity value for any one pixel in the group of neighboring pixels.

8. The method of claim 1, further comprising determining a pixel from the group of neighboring pixels whose estimated intensity value is closest to the an estimated intensity value of the target pixel.

9. The method of claim 8, further comprising selecting a pixel from the group of neighboring pixels having estimated intensity value is closest to the an estimated intensity value of the target pixel and having a second derivative that is greater than or equal to the estimated intensity value of the target pixel.

10. The method of claim 9, further comprising using as a first candidate for a recovery intensity value for the target pixel the estimated intensity value of the pixel selected from the group of neighboring pixels having the estimated intensity value that is closest to the estimated intensity value of the target pixel and that has the second derivative that is greater than or equal to the estimated intensity value of the target pixel.

11. The method of claim 10, further comprising:
    determining a maximum estimated intensity value of a pixel selected from a first portion the group of neighboring pixels;
    determining a maximum estimated intensity value of a pixel selected from a second portion the group of neighboring pixels; and
    selecting a minimum estimated intensity value between the maximum estimated intensity value of the pixel selected from a first portion and the maximum estimated intensity value of the pixel selected from the second portion as a second candidate for an estimated recovery intensity value.

12. The method of claim 11, further comprising:
    determining a maximum estimated intensity value of a pixel selected from a third portion the group of neighboring pixels;
    determining a maximum estimated intensity value of a pixel selected from a fourth portion the group of neighboring pixels;
    determining a maximum estimated intensity value of a pixel selected from the group of neighboring pixels; and
    selecting as a third candidate for the estimated recovery intensity value a first maximum estimated intensity value from among:
        the maximum estimated intensity value of the pixel selected from the third portion;
        the maximum estimated intensity value of the pixel selected from the group of neighboring pixels; and
        the maximum estimated intensity value of a pixel selected from the group of neighboring pixels.

13. The method of claim 12, further comprising selecting a maximum estimated intensity value from between the first candidate and the second candidate as the estimated recovery intensity value.

14. The method of claim 13, wherein converting the estimated intensity values for the target pixel to the intensity value for the first color comprises:
calculating for a pair of adjacent pixels in the group of neighboring pixels a variance in color between individual pixels in the pair of adjacent pixels in the group of neighboring pixels; and
applying the variance in color to remaining pairs of pixels in the group of pixels;
determining that the estimated intensity value for the target pixel is greater than or equal to an average estimated intensity value for a pair of pixels adjacent to the target pixel and having the first color.

15. The method of claim 1, wherein the first color comprises green.

16. The method of claim 1, wherein the array of pixels is arranged in a Bayer pattern.

17. An image processor having an array of pixels disposed in a plurality of rows, the image processor comprising:
first logic configured to select a row of pixels from among the plurality of rows, wherein the row includes a plurality of pixels having a first color and a plurality of pixels having a second color;
second logic configured to:
estimate intensity values for pixels having the second color as if the pixels having the second color were pixels having the first color;
determine whether at least one target pixel in the row is defective using the estimated intensity values for pixels having the second color, and
if the target pixel is defective, convert the estimated intensity values for the target pixel from the second color to an estimated intensity value for the first color and replace an actual intensity value for the target pixel with a recovery intensity value for the target pixel, the recovery intensity value being the estimated intensity value for the first color.

18. The image processor of claim 17, wherein the second logic is further configured to estimate intensity values by extrapolating intensity values for the target pixel using intensity values of a group of neighboring pixels.

19. The image processor of claim 18, wherein the second logic is further configured to estimate intensity values by calculating, for each pair of adjacent pixels in the group of neighboring pixels, color differences between individual pixels in the pairs of adjacent pixels.

20. The image processor of claim 19, wherein the second logic is further configured to estimate intensity values by selecting a median intensity value from among the calculated color differences.

21. The image processor of claim 17, wherein the second logic is further configured to estimate intensity values by performing linear interpolation of estimated intensity values for the group of neighboring pixels to arrive at an average estimated intensity value for the group of neighboring pixels.

22. The image processor of claim 21, wherein the second logic is further configured to characterize the target pixel as a defective "white" pixel if:
an estimated intensity value for the target pixel is greater than the average estimated intensity value for the group of neighboring pixels plus a predetermined threshold value; and
the estimated intensity value for the target pixel is greater than or equal to a maximal estimated intensity value for any one pixel in the group of neighboring pixels.

23. The image processor of claim 21, wherein the second logic is further configured to characterize the target pixel as a defective "black" pixel if:
an estimated intensity value for the target pixel is less than the average estimated intensity value for the group of neighboring pixels minus a predetermined threshold value; and
the estimated intensity value for the target pixel is smaller than or equal to a minimal estimated intensity value for any one pixel in the group of neighboring pixels.

24. The image processor of claim 17, wherein the second logic is further configured to determine a pixel from the group of neighboring pixels whose estimated intensity value is closest to the an estimated intensity value of the target pixel.

25. The image processor of claim 24, wherein the second logic is further configured to select a pixel from the group of neighboring pixels having estimated intensity value is closest to the an estimated intensity value of the target pixel and having a second derivative that is greater than or equal to the estimated intensity value of the target pixel.

26. The image processor of claim 25, wherein the second logic is further configured to use as a first candidate for a recovery intensity value for the target pixel the estimated intensity value of the pixel selected from the group of neighboring pixels having the estimated intensity value that is closest to the estimated intensity value of the target pixel and that has the second derivative that is greater than or equal to the estimated intensity value of the target pixel.

27. The image processor of claim 26, wherein the second logic is further configured to:
determine a maximum estimated intensity value of a pixel selected from a first portion the group of neighboring pixels;
determine a maximum estimated intensity value of a pixel selected from a second portion the group of neighboring pixels; and
select a minimum estimated intensity value between the maximum estimated intensity value of the pixel selected from a first portion and the maximum estimated intensity value of the pixel selected from the second portion as a second candidate for an estimated recovery intensity value.

28. The image processor of claim 27, wherein the second logic is further configured to:
determine a maximum estimated intensity value of a pixel selected from a third portion the group of neighboring pixels;
determine a maximum estimated intensity value of a pixel selected from a fourth portion the group of neighboring pixels;
determine a maximum estimated intensity value of a pixel selected from the group of neighboring pixels; and
select as a third candidate for the estimated recovery intensity value a first maximum estimated intensity value from among:
the maximum estimated intensity value of the pixel selected from the third portion;
the maximum estimated intensity value of the pixel selected from the group of neighboring pixels; and
the maximum estimated intensity value of a pixel selected from the group of neighboring pixels.

29. The image processor of claim 28, wherein the second logic is further configured to select a maximum estimated intensity value from between the first candidate and the second candidate as the estimated recovery intensity value.

30. The image processor of claim 29, wherein the second logic is further configured to calculate for a pair of adjacent pixels in the group of neighboring pixels a variance in color between individual pixels in the pair of adjacent pixels in the group of neighboring pixels; and apply the variance in color to remaining pairs of pixels in the group of pixels;

determine that the estimated intensity value for the target pixel is greater than or equal to an average estimated intensity value for a pair of pixels adjacent to the target pixel and having the first color.

31. The image processor of claim 17, wherein the first color comprises green.

32. The image processor of claim 17, wherein the array of pixels is arranged in a Bayer pattern.

* * * * *